C. W. DURNFORD.
COMBINED PUMP AND ELECTRIC MOTOR.
APPLICATION FILED DEC. 6, 1917.
1,377,326.
Patented May 10, 1921.
2 SHEETS—SHEET 1.
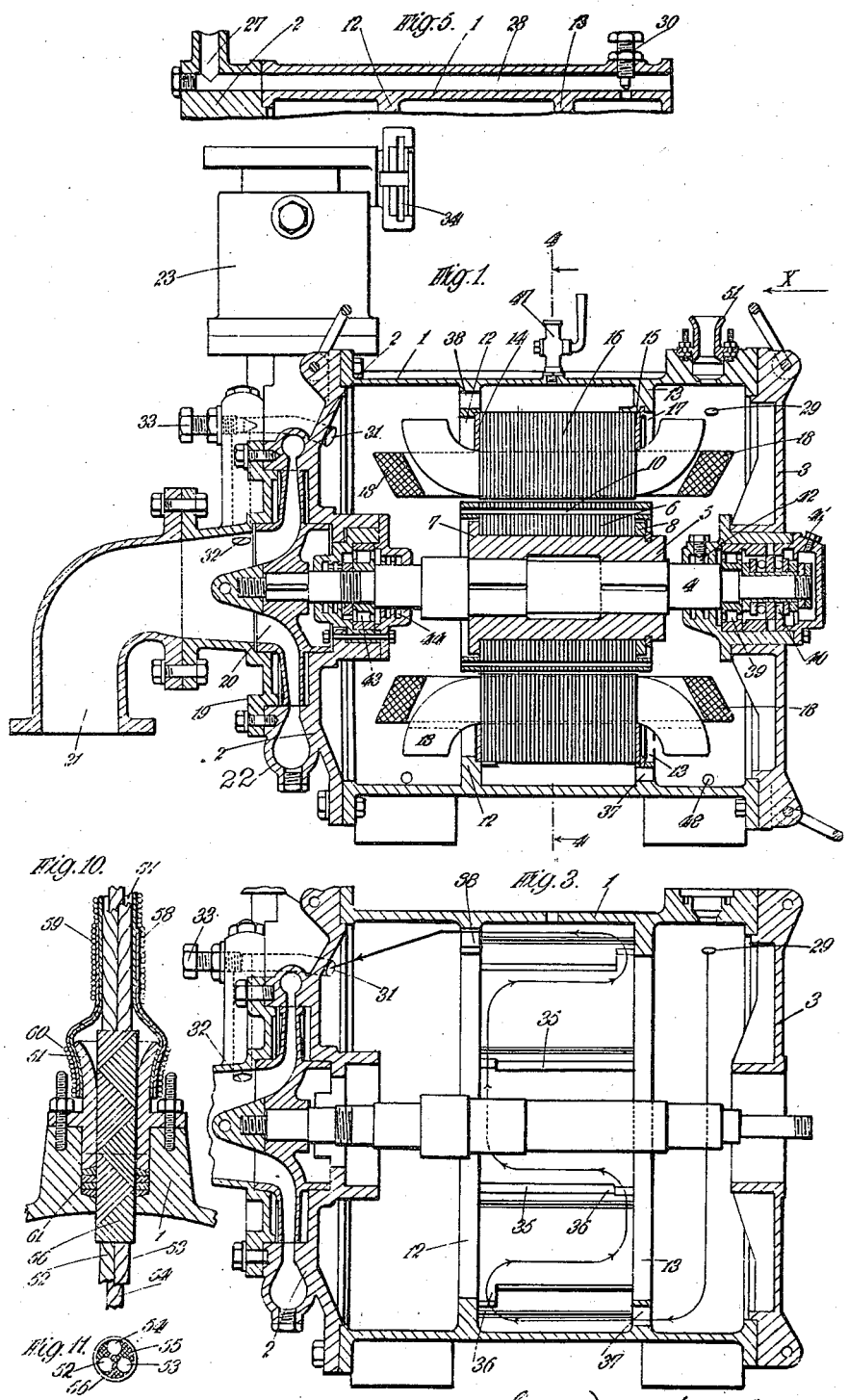

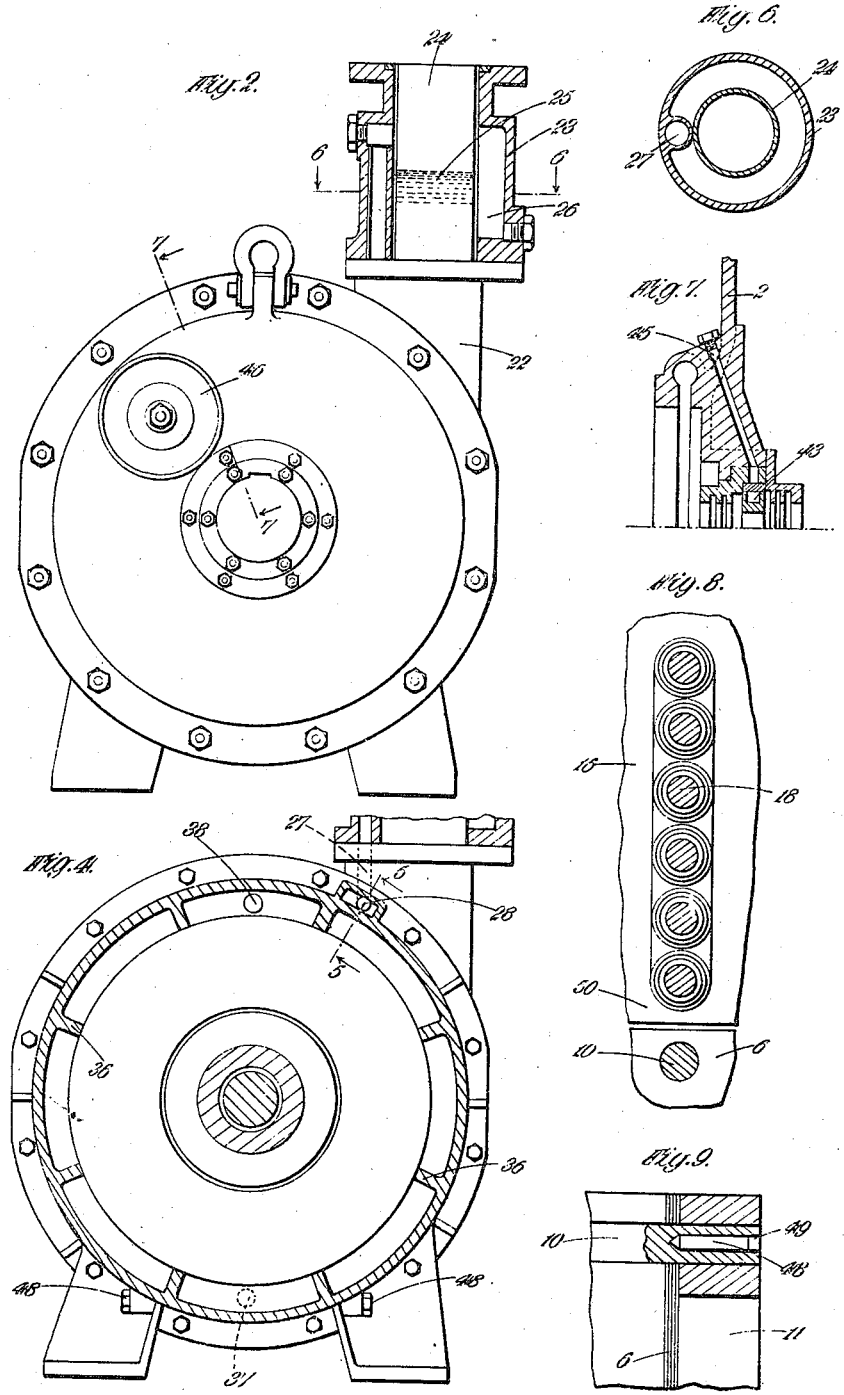

UNITED STATES PATENT OFFICE.

CHARLES WRIGHT DURNFORD, OF WEST EALING, ENGLAND, ASSIGNOR TO SUBMERSIBLE & J-L MOTORS, LIMITED, OF SOUTHALL, ENGLAND.

COMBINED PUMP AND ELECTRIC MOTOR.

1,377,326.  Specification of Letters Patent.  Patented May 10, 1921.

Application filed December 6, 1917. Serial No. 205,872.

*To all whom it may concern:*

Be it known that I, CHARLES WRIGHT DURNFORD, a subject of the King of Great Britain, residing at 4 St. Stephen's avenue, West Ealing, in the county of Middlesex, England, have invented certain new and useful Improvements in or Relating to Combined Pumps and Electric Motors, of which the following is a specification.

This invention relates to combined pumps and electric motors of the kind adapted to be operated or run when submerged in water and in which the pump supplies water to the motor for cooling purposes.

According to this invention means are provided for controlling the flow of water before it enters and when it leaves the motor casing. Preferably the flow of water is controlled, by means of needle valves which form part of the pump and motor structures.

By providing means for controlling the flow of water both at the inlet and outlet to the motor the advantage is obtained that the pump and motor set can be easily adjusted for operating when submerged at different depths.

The invention also comprises an improved construction of pump and motor set as hereinafter described which is generally more effective for the purpose for which it is intended and is less liable to break down than those hitherto proposed.

The invention will be fully understood from the following description taken in connection with the accompanying drawings which illustrate the preferred construction of a pump and motor set according to this invention and in which:—

Figure 1 is a central section of the combined pump and motor.

Fig. 2 is an end elevation looking in the direction of the arrow X in Fig. 1.

Fig. 3 is a central section of the motor and pump with the stator, rotor and bearings removed.

Fig. 4 is a section on the line 4—4 in Fig. 1.

Fig. 5 is a part section on the line 5—5 in Fig. 4.

Fig. 6 is a section on the line 6—6 in Fig. 2.

Fig. 7 is a part section through the pump on the line 7—7 in Fig. 2.

Fig. 8 is a section through one of the stator slots on an enlarged scale.

Fig. 9 is a section through one of the rotor bars and an end ring on an enlarged scale.

Fig. 10 is a section on an enlarged scale of the cable gland in the motor casing showing the method of fixing the cables and Fig. 11 is a part section on the line 11—11 in Fig. 10.

The motor is a three-phase alternating current induction motor, the rotor being of the squirrel cage type. The pump is of the centrifugal type, the vane structure being mounted on the motor shaft. The motor comprises a cylindrical casing 1 closed at one end by a plate 2 which forms part of the structure or casing of the pump and at the other end by a plate 3. Mounted in bearings in the end plates is the rotor shaft 4. The rotor comprises a sleeve 5 keyed to the shaft 4 and carrying iron stampings 6 which are clamped between a collar 7 on the sleeve 5 and a ring 8 on the same. The stampings 6 are keyed on the sleeve 5 and the ring 8 is held in position by a spring ring 9. The stampings 6 are coated with waterproof composition and are compressed into position while the composition is wet so that they form a solid mass. Passing through holes in the plates 6 are the rotor bars or conductors in the form of rods 10. The rods 10 are joined at each end to copper short-circuiting rings 11, in a manner hereinafter described, to form a squirrel cage rotor. Two parallel ribs 12 and 13 extend around the inside of the casing 1. Plates 14 and 15 fit into shoulders on the two ribs 12 and 13 and clamp the iron stampings 16 of the stator between them, the plate 15 being held in position by a spring ring 17. The stampings 16 are coated with waterproof composition similarly to the stampings 6 of the rotor. The conductors 18 of the stator pass through slots in the stator as hereinafter described. The conductors 18 are only shown diagrammatically in Fig. 1.

The pump comprises a casing formed of the plate or structure 2, hereinbefore referred to, and a structure 19. The pump is provided with a vane structure 20 and an intake 21. The pump delivers water to an outlet 22 the water then passing through a fitting 23 from which a certain amount of water is drawn off to supply the circulating water for the motor. The water delivered by the pump passes through a cylindrical passage in the fitting 23 formed by a cylinder of brass 24 which is provided with a number of saw cuts 25. Some of the water passes through these saw cuts into a chamber 26 and enters the top of a cylindrical passage 27 whence it passes to a passage 28 formed integral with the motor casing. The water enters the motor casing through the inlet opening 29 which inlet is controlled by a needle valve 30. The water after circulating through the motor as hereinafter described leaves the casing through an outlet 31 whence it passes through a passage to an opening 32 on the suction side of the pump. The outlet 31 is controlled by a needle valve 33.

By the provision of valves both at the inlet and outlet to the motor casing both the pressure of supply and the back pressure due to the head of water above the motor when immersed, can be adjusted so that the motor can be efficiently operated at different depths of immersion. If only the inlet were provided with a valve the flow of water through the motor would vary according to the depth of immersion and consequently the cooling effect of the water would vary.

The fitting 23 acts as a filter for the water which is circulated through the motor, the chamber 26 acting as a settling chamber. A hose coupling is provided at 34, to enable the pump to be charged when working on suction.

Between the ribs 12 and 13 on the motor casing longitudinal ribs 35 extend, these ribs being cut away as at 36 to allow water to pass through them. Water entering through the inlet 29 as hereinbefore referred to falls over the ends of the stator windings 18 and passes through an opening 37 in the rib 13. The water then passes upward on both sides of the motor through the chambers formed by the outside of the stator laminations 16, the casing 1 and the ribs 12, 13 and 35. The openings 36 in the ribs 35 being at opposite ends of adjacent ribs, the water follows a zigzag course until it reaches the top of the motor when it flows through the opening 38 in the rib 12 and leaves by the outlet 31. The water also flows through the gap between the stator and rotor and through the stator slots.

The bearings for the shaft 4 are constructed as follows:

The right-hand bearing comprises a roller bearing 39 and a thrust bearing 40. Thick grease is inserted into the bearings through an opening 41 by means of a pump so as to fill up the bearings with the grease. At 42 a water seal filled with grease is provided. The left hand bearing comprises a roller bearing 43 and a water seal 44 both of which are filled with grease through the opening 45 (see Fig. 7).

An inspection cover 46 is provided in the end plate 3 and a relief cock is provided at 47. Drain plugs are provided at 48.

The rotor bars 10 of the motor are connected to the short circuiting rings 11 by a method which forms the subject of my copending application Serial No. 205,873 filed 6th December, 1917. The end of each bar 10 (see Fig. 9) passes through the ring and is drilled to receive a steel pin 48. The pin 48 is driven into the bar 10 acting as a wedge to expand the end of the bar and make a tight fit with the ring 11. The space left beyond the outer end of the pin is filled with solder 49. The pins 48 may be coated with copper before being driven into the bars 10 and in this case it is not necessary to leave a space beyond the outer end of each pin to receive solder.

By the method of joining the rotor bars to the end rings no cavities are left in which corrosion can be set up.

The conductors of the stator winding are arranged in the slots as shown in Fig. 8. The slots and conductors are of such size that only one conductor is arranged in the breadth of the slot whereby there is less liability of the conductors to become overheated. This feature is claimed in my copending application Serial No. 205,871 filed 6th December, 1917. Further the slots are closed as shown at 50 for the purpose of obtaining strength. The conductors are insulated by vulcanized rubber, there being no layer of unvulcanized rubber between the vulcanized rubber and the conductor as in the method usually adopted in insulating conductors. The conductors consist of a number of twisted thin wires thereby obtaining the necessary flexibility, as owing to closed slots being used coils wound on formers cannot be employed and also it is desirable that the conductors should be continuously insulated and consequently they cannot be joined.

The conductors from the stator are led out of the motor for a considerable length, say 50 feet, without any joint, through a gland 51 in the casing 1 (see Figs. 1, 10 and 11). Each of the three conductors 52, 53 and 54 is bound with a layer of vulcanizing tape and strips 55 of any suitable plastic insulating material are cut to fit the spaces between the cables. The whole cable where it passes through the gland is bound with vulcanizing tape 56 and vulcanized to form a three-core cable. The cable is covered throughout its length with a canvas tube 57. The lower end of this tube is split and brought over the mouthpiece of the gland. Another short piece of canvas tube 58 is slipped over the mouthpiece and the first mentioned canvas tube and bindings of strong string are applied at 59 and 60. At 61 washers of any suitable plastic insulating material are provided and by tightening up the gland these washers are compressed and expand the cable above and below the washers, thereby insuring a tight fit for the cable in the gland. Any pull applied to the cable outside the motor casing is therefore not transmitted to the motor windings. This feature of clamping the continuous leads is claimed in my copending application Serial No. 205871.

What I claim and desire to secure by Letters Patent of the United States is:—

1. A combined submersible pump and electric motor in which the pump serves to circulate water through the motor casing and in which means are provided for controlling the flow of water before it enters and when it leaves the motor casing.

2. A combined submersible pump and electric motor in which a part of the water delivered by the pump is circulated through the motor casing and in which means are provided for controlling the flow of water before it enters and when it leaves the motor casing.

3. A combined submersible pump and electric motor in which a part of the water delivered by the pump is led to the motor casing and then returned to the suction side of the pump and in which means are provided for controlling the flow of water before it enters and when it leaves the motor casing.

4. A combined submersible pump and electric motor in which the pump serves to circulate water through the motor casing and in which needle valves are provided for controlling the flow of water before it enters and when it leaves the motor casing.

5. A combined submersible pump and electric motor of the induction type in which the pump serves to circulate water through the motor casing and in which water has access to the outside of the stator, the gap between the stator and rotor, and the slots in which the stator windings are placed, there being means for controlling the flow of water before it enters and when it leaves the motor casing.

6. A combined submersible pump and electric motor in which the pump serves to circulate water through the motor casing, the water having direct access to the stator and rotor and in which needle valves are provided for controlling the flow of water before it enters and when it leaves the motor casing, the needle valves forming part of the pump and motor structures.

CHARLES WRIGHT DURNFORD.